United States Patent [19]

Rinklake et al.

[11] Patent Number: 5,060,447
[45] Date of Patent: Oct. 29, 1991

[54] TIE ROD

[75] Inventors: Manfred Rinklake, Emmendingen; Albert Frischmann, Kenzingen; Anisi Daryoush, Wyhl; Paul Steurer, Teningen, all of Fed. Rep. of Germany

[73] Assignee: Upat GmbH & Co., Emmendingen, Fed. Rep. of Germany

[21] Appl. No.: 591,797

[22] Filed: Oct. 2, 1990

[30] Foreign Application Priority Data

Nov. 4, 1989 [DE] Fed. Rep. of Germany ....... 3936804

[51] Int. Cl.$^5$ ............................................. F16B 13/04
[52] U.S. Cl. ....................................... 52/698; 411/33; 411/75
[58] Field of Search ...................... 52/698; 411/33, 75; 405/259-261

[56] References Cited

U.S. PATENT DOCUMENTS 4,193,246  3/1980  Schiefer et al. .......................... 52/698
4,195,709  4/1980  Gianotti et al. .......................... 52/698

Primary Examiner—Richard E. Chilcot, Jr.
Assistant Examiner—Wynn Wood
Attorney, Agent, or Firm—Jeffers, Hoffman & Niewyk

[57] ABSTRACT

A tie rod with a fastening section presenting several spreading cones is provided with a cage which divides the hardenable mortar composition used for the fastening in a cylindrical bore hole into segments. On the occurrence of a crack through the fastening ground of the bore hole, a respreading of the mortar shell formed by the hardenable mortar composition is made possible by a tensile force on the tie rod.

20 Claims, 4 Drawing Sheets

TIE ROD

BACKGROUND OF THE INVENTION

The invention relates to a tie rod with a shaft section and a front fastening section cementable by means of a hardenable composition in a bore hole of a construction, which fastening section presents several offset spreading cones tapering from the front insertion end to the rear load-reception end.

Such tie rods are known, however these known tie rods do not permit a secure fastening in the crack zone of a ceiling. If a crack in the construction runs through the bore hole in which the tie rod is set by mortar, then, on a widening of the bore hole in consequence of an opening crack, the crack may run along the circumference of the mortar shell formed around the tie rod and in the process, the connection of the mortar shell with the construction is loosened, so that the tie rod with the mortar shell can drop out.

Underlying the invention is the problem of providing a tie rod of the type mentioned above which assures a secure fastening also in the case of the widening of the bore hole in consequence of an opening crack.

SUMMARY OF THE INVENTION

This problem is solved according to the present invention in the case of a tie rod of the type mentioned above by providing a cage slidable onto the fastening section, which cage has at its disposal several axially extending separating webs extending radially into the taperings between the spreading cones.

The flat separating webs running radially in cross section bring about an interruption or weakening of the mortar shell formed after the hardening-out of the hardenable composition, so that this shell in the widening of the bore hole in consequence of the crack breaks open along the separating webs and, through a sliding of the tie rod in the direction of the rear load-receiving end, is respread.

In an advantageous example of execution of the invention, the separating webs consisting of plastic, are joined at both their ends in each case by a ring. The tie rod may present in its fastening section several grooves running axially in their fastening section and extending to the depth of the taperings between the spreading cones for the guidance of the flat separating webs. Alternatively, it can be provided that the rings are constructed in each case segmentally and the flat webs are recessed on the inward-facing edges in sawtooth form complementarily to the axial contour of the spreading cones.

If the two rings are constructed as closed rings, it is advantageous to provide the rear ring of the cage facing away from the insertion end with an inside diameter which corresponds to the maximum diameter of the spreading cones and to the diameter of the shaft section adjacent to the spreading cones. The front ring of the cage, arranged at the insertion end has preferably an inside diameter that is less than the maximum diameter of the spreading cones.

For the setting of the tie rod into the cylindrical bore hole there is introduced a hardenable composition and then the tie rod is turned in. There it is expedient to provide the cage with several mixing wings on the insertion-side end, so that in the rotating driving-in of the tie rod with its cage a good thorough mixing of the mortar composition can take place.

In order to make it possible to check the setting depth of the tie bar, it is expedient for the cage to have extension webs on its rear end which extend to a stop flange revolving about the shaft of the tie rod.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
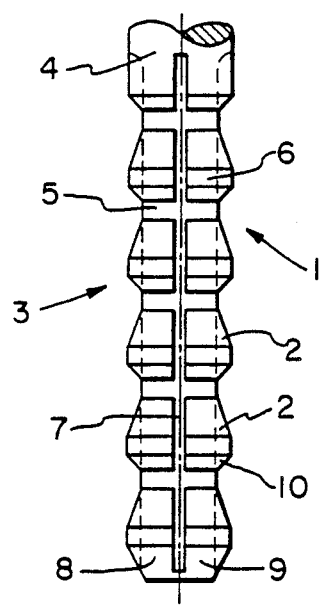
FIG. 1 shows the fastening section of the tie rod of the invention without the shaft section, the front part of which is formed as a smooth cylinder and the rear part of which is formed as a threaded bolt, in a side view.

FIG. 1 illustrates the insertion end of a tie rod 1 without its shaft section, the load-side end of which is provided with a thread. Between the section of the shaft section provided with a screw thread (not shown) and the fastening section 3 provided with several spreading cones 2, there is present a smooth shaft section 4, the outside diameter of which corresponds to the maximum diameter of the spreading cones 2. The spreading cones 2 extend in each case between a reduced diameter portion, such as the cylindrical neck 5 and a pull-over zone 6, the diameter of which corresponds to the outside diameter of the smooth shaft section 4. The spreading cones 2 taper, therefore, in the direction from the front end of the tie rod 1 to the rear end of the tie rod 1.

As is shown in FIG. 1, the spreading cones 2 are provided with axially running grooves 7 which extend in radial direction up to the outside diameter of the cylindrical necks 5. In axial direction, the grooves 7 extend into the smooth shaft section 4.

At the front insertion end 8, the front spreading cone 2 goes over into a blunt tip 9, the angle of which corresponds about to the conical angle of the spreading cones 2. The grooves 7 extend into the blunt tip 9 in the manner represented in FIG. 1.

Between the cylindrical necks 5 and the transition zones 6 there are present steep-conical sections 10 in the manner represented in FIG. 1.

Figure 2:
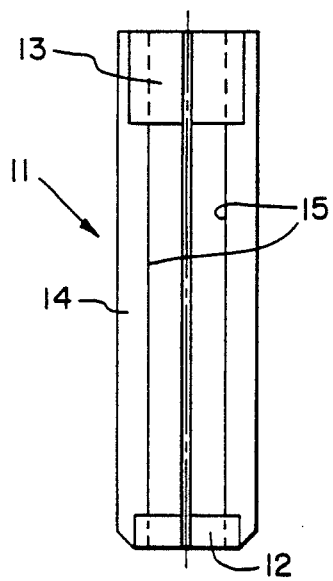
FIG. 2 is the slide-on cage in a side view.
Figure 4:
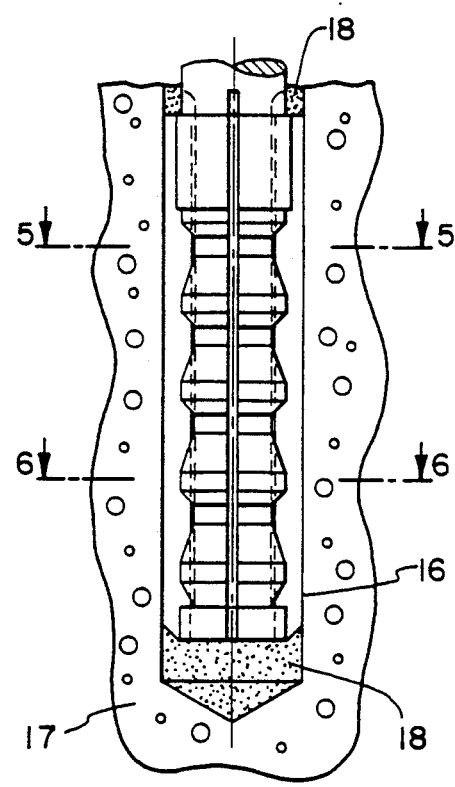
FIG. 4 is the tie rod according to FIG. 1 after the slipping-on of the cage according to FIG. 2 and the mortaring into a cylindrical bore hole.

The grooves 7 in the fastening section 3 of the tie rod 1 make it possible to slide the cage 11 of plastic represented in FIG. 2 in axial direction, guided by the grooves 7, until the cage 11 has the position shown in FIG. 4.

Figure 3:
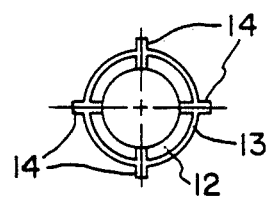
FIG. 3 is the cage according to FIG. 2 in a plan view of the rear ring.

The form of the cage 11 is shown in FIGS. 2 and 3. The cage 11 consists of a front ring 12 of smaller diameter and a rear ring 13 of larger diameter. Between the front ring 12 and the rear ring 13, there extend four equidistantly arranged flat separating webs 14, which extend inward in radial direction and outward over the rear ring 13 and in radial direction outward over the front ring 12.

The webs may possibly be provided with film hinges, so that the webs can bend off to the rear in rotary assembling. The radial distance between the inward-facing edges 15 of the separating webs 14 corresponds to the diameter of the cylindrical necks 5. The thickness of the separating webs 14 is equal to or less than the width of the grooves 7, so that the cage 11 can be thrust in axial direction over the front insertion end 8 onto the tie rod 1, when the separating webs 14 align with the grooves 7.

FIG. 4 shows the tie rod 1 after the sliding-on of the cage 11. Furthermore, FIG. 4 shows a cylindrical bore hole 16 in the fastening ground 17 of a construction, in which the bore hole before the sliding-in of the tie rod 1 provided with the cage 11 has been partially filled with a mortar or a hardenable composition 18. After the sliding-in of the tie rod 1 with the cage 11, the hardenable composition 18, in the manner represented in FIGS. 4, 5 and 6, surrounds the tie rod 1, in which process as small a part as possible of the hardenable composition 18 surrounds the smooth shaft section 4. The annular space around the fastening section 3 of the tie rod 1 interrupted by the separating webs 14, is surrounded with the hardenable composition, in the manner shown in FIGS. 5 and 6, which, after the hardening forms a mortar shell, is separated or much weakened along the separating webs 14 in the desired breaking places by the separating webs 14.

Figure 5:
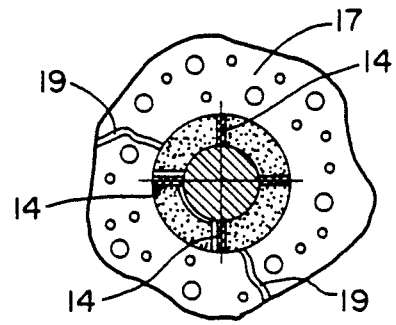
FIG. 5 is a radial- cross section along the line V—V in FIG. 4.

FIG. 5 shows in cross section the mortar shell formed from the hardenable composition 18 in the zone of a cylindrical neck 5. A crack 19 running through the fastening ground 17 is propagated at first along the outside of the mortar shell formed by the hardenable composition 18. As shown in FIG. 5, a further section of the crack 19 runs parallel to the next-lying separating web 14 and from there along the outer circumference of the cylindrical neck 5 before, along a further web 14, it goes over again into the fastening ground 17.

If after the hardening of the hardenable composition 18 such a crack 19 appears, the hardened composition 18 forms a mortar shell of 4 segments which, with the aid of the spreading cone 2, can be radially spread by a tensile load onto the tie rod 1. In this manner, an enlargement of the bore hole 18 in consequence of a crack 19 cannot lead to a loosening of the tie rod 1.

Figure 6:
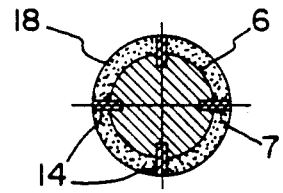
FIG. 6 is a radial cross section along the line VI—VI in FIG. 4.

FIG. 6 shows a cross section through the tie rod 1 in the plane indicated by the line VI—VI in FIG. 4. In particular, FIG. 6 shows the separating webs 14 engaging into the grooves 7.

Figure 7:
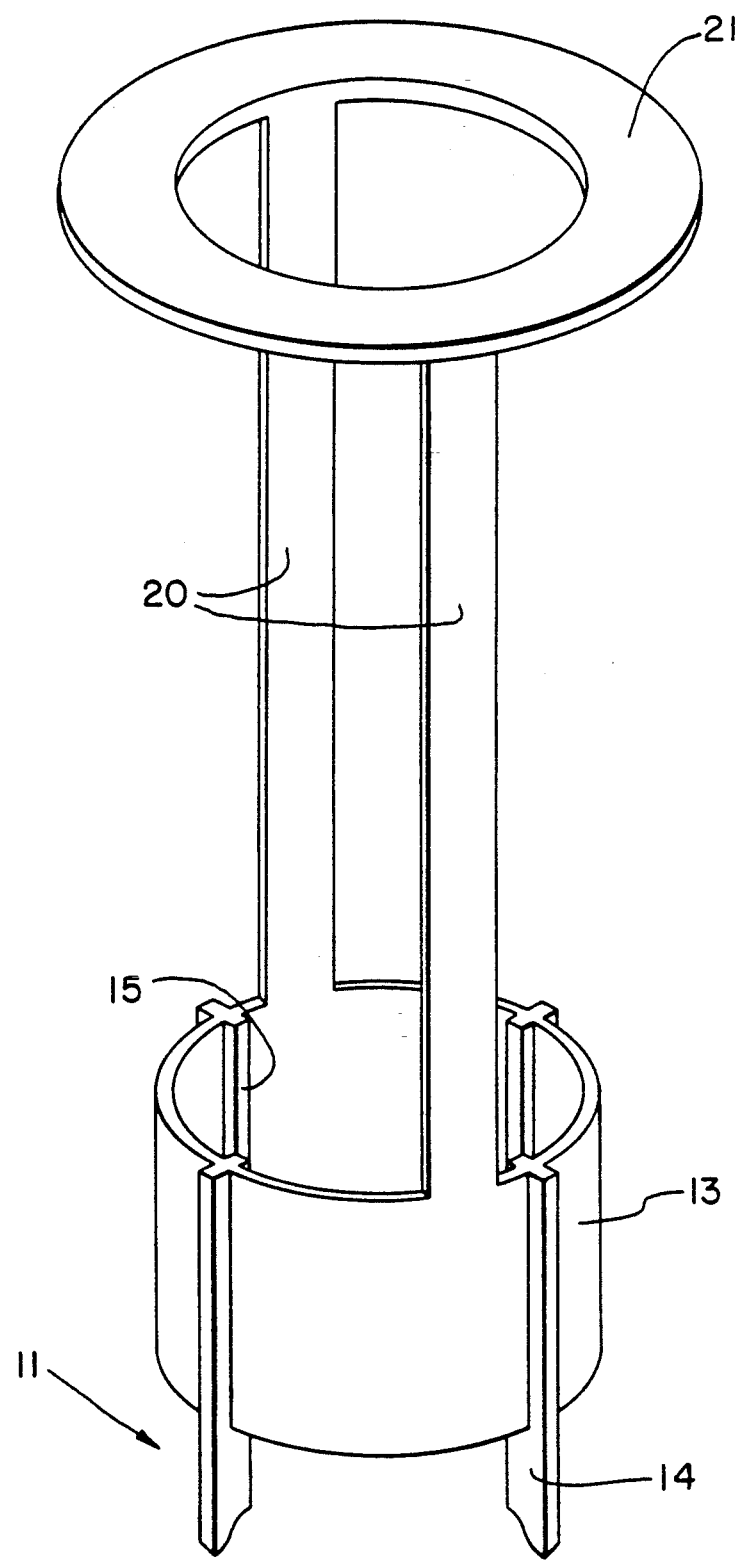
FIG. 7 is a perspective view of a cage modified with respect to FIG. 2 with extension webs molded onto the rear ring, which go over into a stop flange.

In order to assure a defined setting depth in the thrusting of the tie rod 1 into a bore hole 14, it is possible according to FIG. 7 for the cage 11 represented in FIG. 2 to be provided on its rear ring 13 with flat extension webs 20 which, in the manner recognizable in FIG. 7, are connected with a stop flange 21, which has an outside diameter that is greater than the diameter of the bore hole 16 and an inside diameter that is equal to or slightly greater than the diameter of the smooth shaft section 4 of the tie rod 1.

Figure 8:
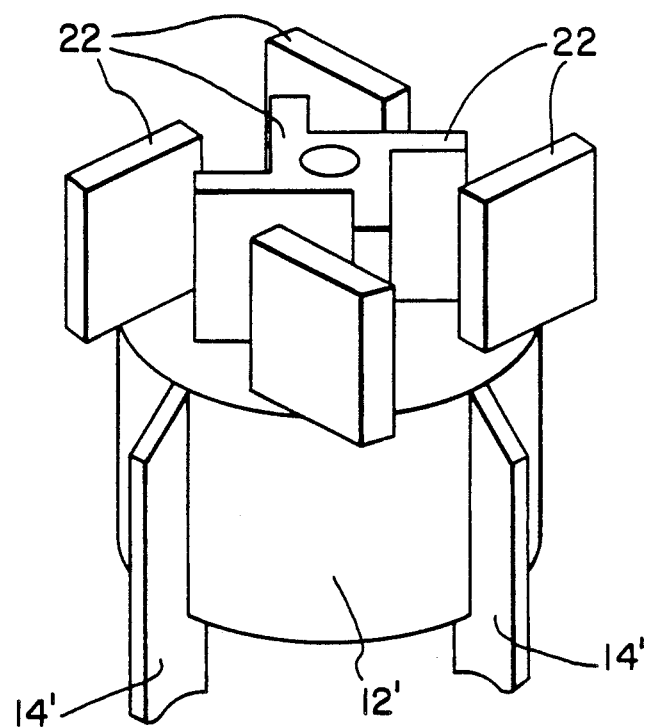
FIG. 8 is a cage modified with respect to FIG. 2, the front ring of which is provided with mixing wings.

In FIG. 8, there is shown an embodiment for a cage 11 having a front ring 12' and separating webs 14' wherein front ring 12' is provided with a plurality of mixing wings (blades) 22, which make it possible in a rotary setting with a non-premixed composition or mortar for the tie rod 1 with the slide-on cage 11 to well mix the hardenable composition 18 introduced into the bore hole 16.

Figure 9:
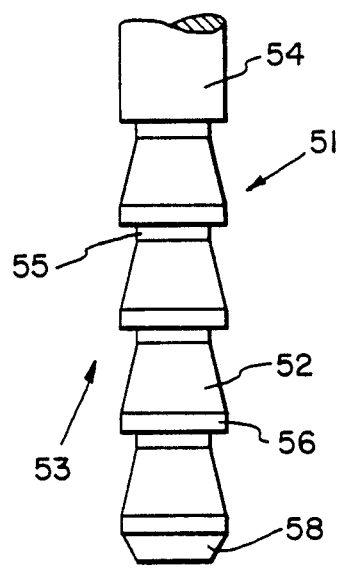
FIG. 9 is a tie rod modified with respect to FIG. 1.

FIGS. 9 to 13 illustrate modifications with respect to the tie rod 1 and the cage 11. In FIG. 9, there is illustrated a tie rod 51 with several spreading cones 52 which form the fastening section 53 of the tie rod 51. Between the spreading cones 52 there are present in each case cylindrical necks 55. On the front ends of the spreading cones 52 expanding forward there are provided in each case cylindrical cover zones 56.

On the front insertion end 58 there is provided a blunt tip 59. Grooves 7, as in the embodiment described with the aid of FIGS. 1–6, are not present in the tie rod 51 according to FIGS. 9–13.

Figure 10:
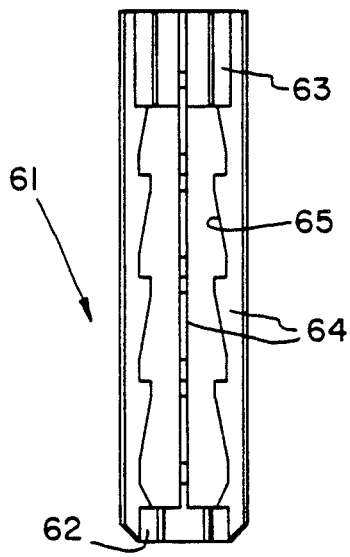
FIG. 10 is a cage modified with respect to FIG. 2, which is slidable laterally in radial direction onto a tie rod according to FIG. 9.
Figure 11:
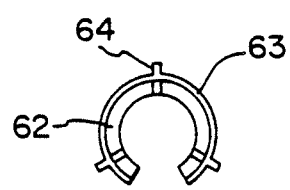
FIG. 11 is a plan view of the segmentally recessed cage according to FIG. 10.

In FIG. 10 a cage 61 is shown; which cage presents a front ring 62 and a rear ring 63 of deformable plastic. Rings 62, 63, in the manner best shown in FIG. 11, are segmentally recessed so that the rings 62, 63, in the manner shown in FIG. 12, can be bent open resiliently, in order to be thrust laterally over the tie rod 51.

The front ring 62 and the rear ring 63 are joined with one another over three flat radially oriented and axially extending separating webs 64. The inward-facing edges 65 of the separating webs 64 are recessed in sawtooth form complementarily to the axial contour of the spreading cones 52, so that in a manner analogous to the example of execution represented in FIGS. 4–6, mortar shell segments are formed which are separated from one another in each case by separating webs 64.

Figure 13:
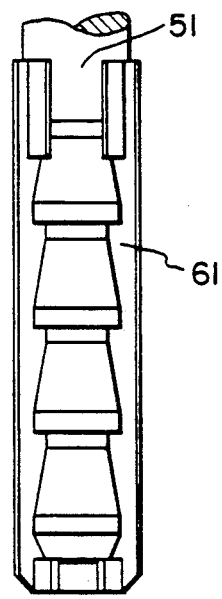
FIG. 13 is the tie rod according to FIG. 9 after the sliding-on of the cage.
Figure 12:
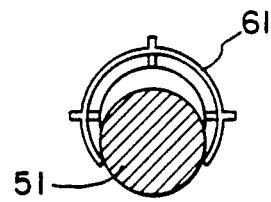
FIG. 12 is a plan view to illustrate the sliding-on of the cage according to FIG. 10 onto the tie rod according to FIG. 9.

After the sliding-on of the cage 61 onto the tie rod 51, in the manner shown in FIG. 12, the fastening section 53 of the tie rod 51 has the form shown in FIG. 13. The arrangement represented in FIG. 13 can be introduced correspondingly to FIG. 4 into a cylindrical bore hole 16, in which case after the hardening of the hardenable composition 18 between the separating webs 64 mortar shell segments are formed which can be respread after the arising of a crack by a tensile load on the tie rod 51.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. Tie rod with a shaft section and a front fastening section cementable by means of a hardenable composition into a bore hole of a construction, said fastening section including several axially offset spreading cones tapering from a front insertion end to a rear load-receiving end of said tie rod, said fastening section including respective reduced diameter portions disposed axially between adjacent spreading cones, characterized in that a cage slidable onto said fastening section is provided, wherein said cage includes several flat separating webs extending radially and projecting radially into said reduced diameter portions between said spreading cones.

2. Tie rod according to claim 1, wherein said separating webs have two ends and are joined at each of said ends by a respective ring of said cage.

3. Tie rod according to claim 1, wherein said tie rod presents in said fastening section several grooves running axially and extending radially to the depth of said reduced diameter portions for guiding said flat separating webs.

4. Tie rod according to claim 2, wherein said tie rod presents in said fastening section several grooves running axially and extending radially to the depth of said reduced diameter portions for guiding said flat separating webs.

5. Tie rod according to claim 2, in which one of said rings comprises a rear ring, wherein said rear ring faces away from said insertion end and has an inside diameter which corresponds to the maximum diameter of said spreading cones and to the diameter of said shaft section adjacent said spreading cones.

6. Tie rod according to claim 3, in which one of said rings comprises a rear ring, wherein said rear ring faces away from said insertion end and has an inside diameter which corresponds to the maximum diameter of said spreading cones and to the diameter of said shaft section adjacent said spreading cones.

7. Tie rod according to claim 5, in which the other of said rings comprises a front ring, wherein said front ring is arranged on said insertion end and has an inside diameter that is less than the maximum diameter of said spreading cones.

8. Tie rod according to claim 6, in which the other of said rings comprises a front ring, wherein said front ring is arranged on said insertion end and has an inside diameter that is less than the maximum diameter of said spreading cones.

9. Tie rod according to claim 2, wherein each of said rings are segmentally recessed.

10. Tie rod according to claim 1, wherein said cage is made of elastic synthetic material.

11. Tie rod according to claim 2, wherein said cage is made of elastic synthetic material.

12. Tie rod according to claim 4, wherein said cage is made of elastic synthetic material.

13. Tie rod according to claim 9, in which said flat separating webs have inward-facing edges, wherein said inward-facing edges are recessed in sawtooth form complementarily to the axial contour of said spreading cones.

14. Tie rod according to claim 10, wherein said flat separating webs have inward-facing edges, wherein said inward-facing edges are recessed in sawtooth form complementarily to the axial contour of said spreading cones.

15. Tie rod according to claim 1, wherein said cage is provided with several mixing blades on the insertion end.

16. Tie rod according to claim 2, wherein said cage is provided with several mixing blades on the insertion end.

17. Tie rod according to claim 9, wherein said cage is provided with several mixing blades on the insertion end.

18. Tie rod according to claim 1, in which said cage includes extension webs on its rearward end, wherein said extension webs extend to a stop flange running about said shaft section of the tie rod.

19. Tie rod according to claim 2, in which said cage includes extension webs on its rearward end, wherein said extension webs extend to a stop flange running about said shaft section of the tie rod.

20. Tie rod according to claim 13, in which said cage includes extension webs on its rearward end, wherein said extension webs extend to a stop flange running about said shaft section of the tie rod.

* * * * *